United States Patent [19]

DeRees

[11] 4,033,245
[45] July 5, 1977

[54] VEHICLE AIR DEFLECTOR

[75] Inventor: Delbert D. DeRees, Utica, Mich.

[73] Assignee: American Motors Corporation, Detroit, Mich.

[22] Filed: Apr. 2, 1976

[21] Appl. No.: 672,948

[52] U.S. Cl. .............................. 98/2.12; 98/2.13; 296/91; 296/84 B

[51] Int. Cl.² .......................................... B60J 1/20

[58] Field of Search ............ 98/2, 2.11, 2.12, 2.13, 98/2.19, 2.16; 296/84 B, 91

[56] References Cited

UNITED STATES PATENTS

| | | | |
|---|---|---|---|
| 2,147,855 | 2/1939 | Normandin | 98/2.12 |
| 2,499,127 | 2/1950 | Bead | 98/2.12 |
| 2,586,090 | 2/1952 | Riggs | 98/2.13 |
| 2,594,682 | 4/1952 | Ritch | 98/2.12 |
| 2,764,928 | 10/1956 | Mantinson | 98/2.12 |
| 3,667,369 | 6/1972 | Smith | 98/2.12 |

*Primary Examiner*—John J. Camby
*Assistant Examiner*—Henry C. Yuen
*Attorney, Agent, or Firm*—Reising, Ethington, Barnard, Perry and Brooks

[57] ABSTRACT

A vehicle air deflector of the disclosure includes an air scoop mounted by an adjustable connection on a support portion of a support member that also has a mounting portion which is positioned between an associated vehicle side door and a detachable exterior rear view mirror support of the door. The adjustable connection for mounting the air scoop is preferably of the ball and socket type so as to permit adjustment of the horizontal and vertical directions of air deflection independently of each other. As disclosed, the rear view mirror and air deflector are located adjacent a front inclined edge of the side door window. The air scoop of the deflector has a curved shape and is positionable in a streamlined position so as to be concave in a downwardly and inwardly facing direction. In this streamlined position, a curved forward and upper edge and a curved rear edge cooperate to give the air scoop a swept-back shape. A straight lower edge of the air scoop is supported by an integral elongated bracket of a first ball socket portion that is cooperable with a second ball socket portion to receive a ball on the support portion of the support member. The mounting portion of the support member has a plate-like construction and defines an opening that receives rear view mirror remote controls upon being positioned between the door and the rear view mirror support. At least one hole in the mounting portion on one side of the opening and an elongated slot on the other side thereof receive securement screws of the rear view mirror support during mounting of the air deflector. The opening for the mirror controls opens in a downward direction below an upwardly extending projection that also defines a hole for receiving an additional securement screw.

9 Claims, 4 Drawing Figures

U.S. Patent  July 5, 1977  Sheet 2 of 2  4,033,245
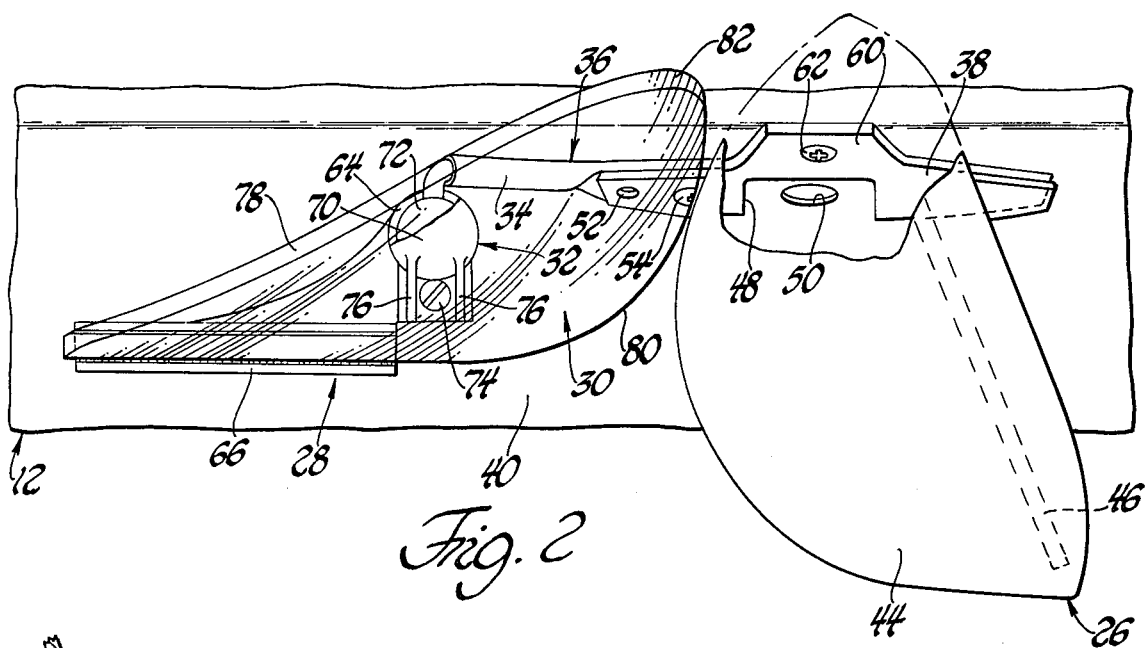
Fig. 2
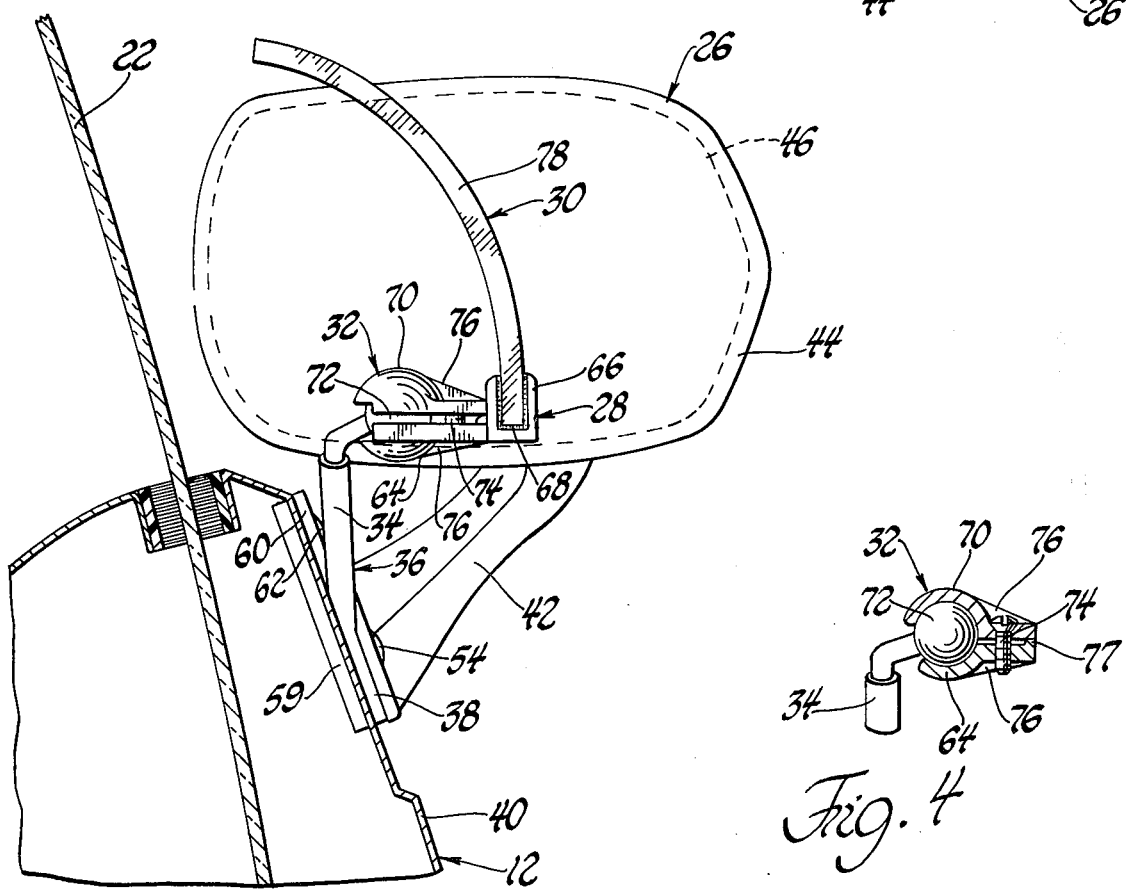
Fig. 3
Fig. 4

1 …

VEHICLE AIR DEFLECTOR

BACKGROUND OF THE INVENTION

1. Field of the Invention

This invention relates to a vehicle air deflector for use with a vehicle side door to provide a deflected air flow when a vertically movable window thereof is lowered to an open or partially open position.

2. Description of the Prior Art

Vehicle air deflectors for selectively deflecting air flow into a passenger compartment during vehicle travel are disclosed by the prior art. Certain of these deflectors have previously been positioned in the cowl area just forward of the windshield so as to be manufactured as an original equipment component of the vehicle. Other vehicle air deflectors have been manufactured as an "add-on" item and are then generally located adjacent a side door window so as to direct the flow of air into the vehicle when the window is in an open position. Examples of such vehicle air deflectors are disclosed by the following U.S. Pat. Nos. 1,247,490; 1,849,176; 1,917,093; 1,968,948; 2,062,475; 2,073,878; 2,152,414; 2,224,433; 2,367,904; 2,499,127; 2,594,682; 2,739,834; 3,090,292; 3,162,112; 3,667,369; 3,779,149; 3,162,112; and 3,803,994.

SUMMARY OF THE INVENTION

The present invention provides a vehicle air deflector including an air scoop mounted by an adjustable connection on a support portion of a support member that also includes a mounting portion which is positioned between and engaged with an associated side door and a detachable exterior rear view mirror support so as to be maintained in position on the door. Lowering of a vertically movable window of the door allows the air scoop to be adjusted so as to direct air flow into the vehicle passenger compartment at the desired direction. Due to the manner in which the mounting portion is secured between the rear view mirror support and the associated vehicle side door, the air deflector may be sold as an original equipment option or may be marketed in after market sales.

The adjustable connection that supports the air scoop on the support portion of the support member is preferably embodied as a ball ad socket connection that permits positioning of the air scoop to provide adjustment of the horizontal and vertical directions of air flow independently of each other. During periods of non-use when the associated side door window is moved to an upper closed position, the air scoop is positionable in a streamlined position where it has a minimum tendency to cause turbulence. In this streamlined position, a curved shape of the air scoop is oriented so as to be concave in an inwardly and downwardly facing direction with respect to the vehicle. A curved forward and upper edge of the air scoop and a curved rearward edge thereof cooperate in this streamlined position to give the scoop a swept-back shape. The curved edges of the scoop meet at a junction located rearward of the ball and socket connection in the streamlined position. A straight lower edge of the scoop connects the lower ends of the two curved edges and is received within an integral elongated bracket of one ball socket portion of the ball and socket connection. Another ball socket portion of the connection cooperates with the other one to receive a ball mounted on the support portion of the support member so as to interconnect the support member and the scoop.

The mounting portion of the air scoop support member has a plate-like construction with at least one hole for receiving one securement screw of the rear view mirror support and an elongated slot for receiving another securement screw of the mirror support. As disclosed, there are two round holes in the mounting portion so it may be secured in position with different model rear view mirrors. An opening located between the elongated slot and the round securement holes receives rear view mirror remote controls when the mounting portion is positioned between the door and the rear view mirror support. This opening opens in a downward direction so as to permit the deflector to be mounted without disconnecting the remote controls. A projection of the mounting portion extends upwardly above the opening and defines a hole for an additional securement screw.

The objects, features and advantages of the present invention are readily apparent from the following detailed description of the preferred embodiment taken in connection with the accompanying drawings.

BRIEF DESCRIPTION OF THE DRAWINGS

FIG. 2 is a partially broken away top plan view taken along line 2—2 of FIG. 1 showing the rear view mirror assembly and the air deflector;

FIG. 3 is an elevation view looking rearwardly along line 3—3 of FIG. 1 at the air deflector and the rear view mirror assembly; and FIG. 4 is a sectional view taken along line 4—4 of FIG. 1 through an adjustable ball and socket connection of the air deflector.

DETAILED DESCRIPTION OF THE PREFERRED EMBODIMENT

Figure 1:
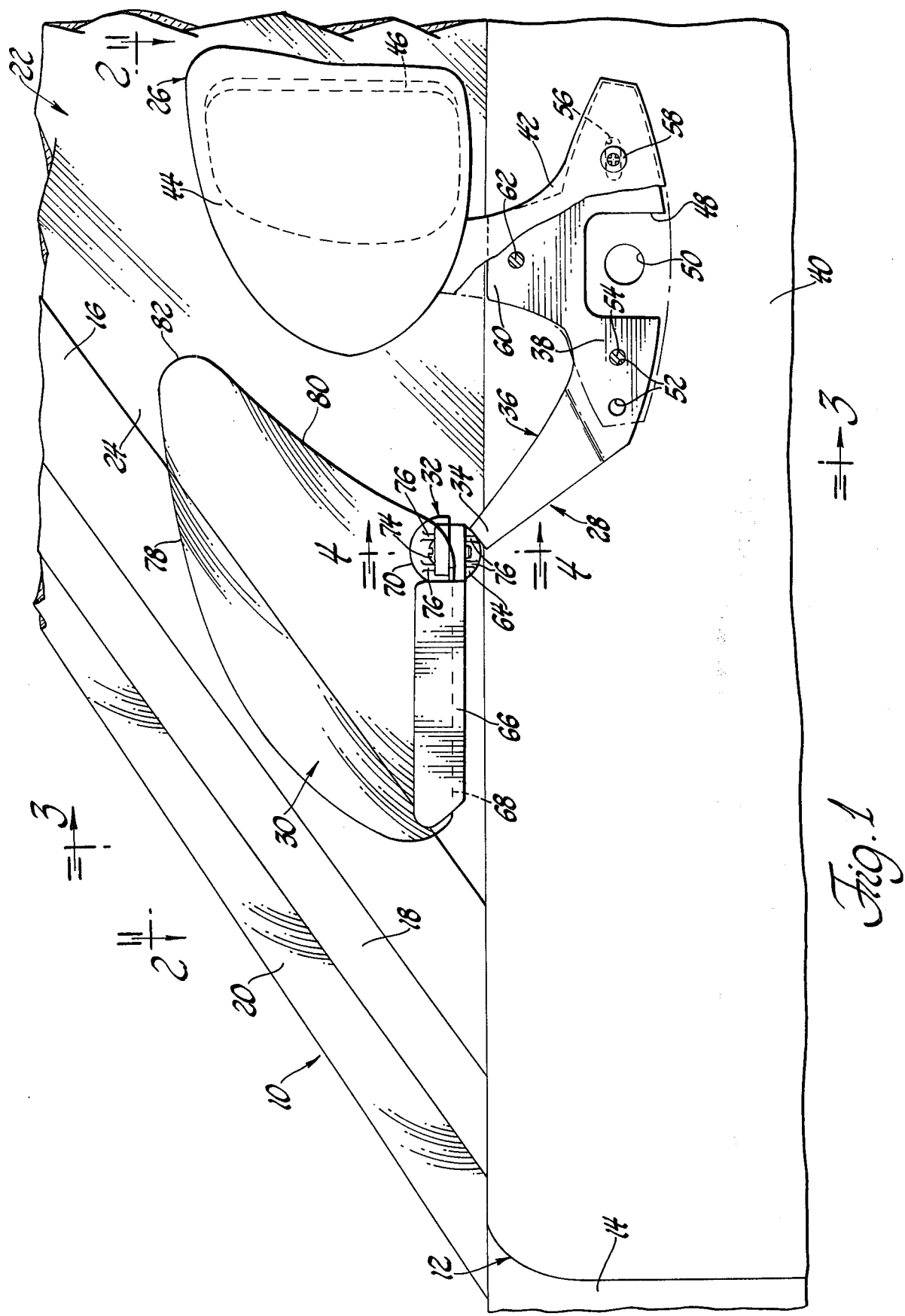
FIG. 1 is a partially broken away side elevation view showing a portion of a vehicle side door having a rear view mirror assembly mounted thereon together with an air deflector that embodies the present invention.

Referring to FIG. 1 of the drawings, a vehicle generally indicated by 10 includes a side door 12 located rearwardly of a front fender 14. Door 12 is movable about a generally vertical hinge axis adjacent its forward end between open and closed positions in a conventional manner. In the closed positions, a rearwardly inclined window frame portion 16 of the door is located below and to the rear of a windshield pillar 18 that bounds the lateral side of a front windshield 20. A vertically movable window 22 of the door has a front extremity defined by a rearwardly inclined front edge 24 that is received within the window frame portion 16 in an upper closed position of the window. A conventional window regulator, not shown, is utilized to move window 22 vertically between the upper closed position and lower partially open and fully open positions. As the window moves downwardly, the inclined window edge 24 moves away from the inclined window frame portion 16 to open the area below and rearward of the window frame portion. A rear view mirror assembly of the side door is generally indicated by reference numeral 26 and permits the vehicle driver to view the area rearward of the vehicle by looking through the side door window 22 in a conventional manner.

An air deflector according to the present invention is generally indicated by 28 in the drawings and functions to direct air flow into the vehicle passenger compartment during vehicle travel when the side door window 22 is lowered to a partially open or fully open position. An air scoop 30 of the deflector is mounted by an adjustable connection 32 on a support portion 34 of a support member 36. Scoop 30 may be made from any suitable material such as clear plastic, colored plastic, glass or metal, i.e. a zinc die casting, etc. A mounting portion 38 of the support member 36 has an inner side engaged with the outer surface of a door outer panel 40 and an outer side engaged by an inwardly oriented face on a detachable mirror support 42 of mirror assembly 26. As seen in FIG. 3, mirror support 42 extends outwardly and upwardly to support a mirror housing 44. This mirror housing 44 supports a rear view mirror 46 in a conventional fashion. The manner in which the support member mounting portion 38 is secured between the detachable mirror support 42 and the door outer panel 40 permits the air deflector to be conveniently mounted for use so it can be sold as either an original equipment option or as an after market product.

As seen by combined reference to FIGS. 1, 2 and 3, the mounting portion 38 of deflector support member 36 has a plate-like construction defining an opening 48 that opens in a downward direction. This opening is aligned with a round aperture 50 in the door outer panel 40 so as to permit conventional cable remote controls, not shown, to extend outwardly and then upwardly through the mirror support for attachment to the mirror to permit remote control mirror positioning. Due to the manner in which the opening 48 opens, these mirror cable controls do not have to be detached from the mirror during the mounting of the air deflector. On one side of the opening 48, the plate-like mounting portion 38 defines a pair of round holes 52 for receiving a securement screw 54 that also secures the mirror support 42 in position. Two such holes 52 are provided in order to allow the air deflector to be mounted with different model mirror assemblies having securement screw holes located in different positions. On the opposite side of opening 48 from securement holes 52, the mounting portion 38 defines an elongated slot 56, FIG. 1, for receiving another securement screw 58. The elongated configuration of slot 56 further enhances the ability of the support member to be mounted with different mirror assemblies whose securement screws are spaced different distances. Each of the securement screws 54 and 58 extends through both the mirror support 42 and the mounting portion 38 of the deflector support member 36 and is threaded into a reinforcing plate 59, FIG. 3, on the inner surface of door outer panel 40. Mounting portion 38 is thus clamped between the door panel 40 and the mirror support 42 when the screws 54 and 58 are tightened to secure the mirror assembly 26 in position. An upwardly extending projection 60 of mounting portion 38 defines a round hole that receives an additional securement screw 62 for reinforcing the mounting of the support member on the door.

As seen by combined reference to FIGS. 1-4, the adjustable connection 32 that secures the air scoop 30 to the support portion 34 of support member 36 is of the ball and socket type so as to permit the air scoop to be positioned for adjustment of the horizontal and vertical directions of air deflection independently of each other. The ball and socket connection 32 includes a first ball socket portion 64 that includes an elongated integral bracket 66 receiving a straight lower edge 68 of the scoop. A suitable adhesive or the like may be utilized to secure the lower scoop edge 68 within bracket 66. A second ball socket portion 70 cooperates with the first ball socket portion 64 to receive a ball 72 on the support portion 34 of support member 36. A screw 74 located between spaced reinforcing ribs 76 of the ball socket portions secures these socket portions to each other so as to frictionally grip the ball 72 and thereby adjustably locate the air scoop 30 in the position to which it is manually adjusted. The degree to which the screw 74 is tightened thus determines the force required to adjust the air scoop 30. As seen by particular reference to FIG. 4, an upwardly extending lug 77 on the lower socket portion 64 engages the lower side of the upper socket portion 70 and acts at a hinge point about which the upper socket portion pivots during tightening of screw 74.

As shown in the figures of the drawings, the air scoop 30 is located in a streamlined position to minimize the turbulence created thereby during vehicle travel. The scoop has a curved shape, FIG. 3, that is concave in a downwardly and inwardly facing direction with respect to the vehicle in the streamlined position. As seen in FIG. 1, a curved forward and upper edge 78 of the scoop and a curved rear edge 80 cooperate to give the scoop a swept-back shape in its streamlined position. Curved edges 78 and 80 have upper and rearward ends that meet each other at a curved junction 82 which is located rearward of the ball and socket connection 32 when the scoop is in the streamlined position. The forward lower ends of curved edges 78 and 80 of the scoop are respectively joined with the forward and rearward ends of its lower edge 68 which is received within the bracket 66 of the ball and socket connection.

The degree to which the air deflector 28 directs air flow into the passenger compartment of the vehicle is determined by the adjusted position of the air scoop 30. Maximum air flow will be achieved when scoop 30 is in an extreme position with the elongated bracket 66 projecting outwardly from the plane of FIG. 1, i.e. in an outward lateral direction with respect to the vehicle. The curved edge 80 of the air scoop will then be located generally adjacent the area occupied by the side door window 22 when it is raised to the closed position. Vertical adjustment to control the angular orientation of the bracket 66 controls the vertical direction to which the scoop directs the air flow. This adjustment allows all passengers who may desire air flow at either their face or their laps to utilize the air deflector. Likewise, the degree to which the deflector deflects air flow into the passenger compartment can be decreased by moving the scoop from the extreme position mentioned above toward the streamlined position shown in the drawings. Also, the outer end of bracket 66 may be moved inwardly to engage the curved edge 78 of the air scoop with the door window frame portion 16 and the scoop will then act to some extent to cause a vacuum flow that sucks air from the passenger compartment outwardly to the environment. Additionally, air deflector 28 may be utilized on the driver's side of the vehicle, on the passenger's side, or on both sides.

While a preferred embodiment of the vehicle air deflector has herein been described, those skilled in the art will recognize various alternative designs and embodiments for practicing the present invention as defined by the following claims.

What is claimed is:

1. A vehicle air deflector for use with a vehicle side door including a vertically movable window, a rear view mirror, and a detachable mirror support for mounting the mirror on the exterior of the door adjacent the front extremity of the window, the air deflector comprising: an air scoop; a support member having a support portion that supports the air scoop and a plate-like mounting portion having inwardly and outwardly facing surfaces; said inwardly and outwardly facing surfaces of the mounting portion on the support member being respectively engaged with the door and the detachable mirror support during mounting so as to be maintained in position on the door; the plate-like mounting portion of the support member having an opening for receiving rear view mirror remote controls; securement screw apertures in the mounting portion of the support member on opposite sides of the opening therein; and an adjustable connection that mounts the air scoop on the support portion of the support member.

2. An air deflector as in claim 1 wherein the adjustable connection comprises a ball and socket connection that enables the air scoop to be positioned on the support member so as to permit adjustment of the horizontal and vertical directions of air deflection independently of each other.

3. An air deflector as in claim 2 wherein the air scoop has a curved shape and is positioned in a streamlined position so as to be concave in an inwardly and downwardly facing direction with respect to the associated vehicle, the scoop having a straight lower edge as well as a curved forward and upper edge and a curved rear edge that cooperate to give the scoop a swept-back shape in the streamlined position.

4. An air deflector as in claim 3 wherein the curved forward and upper edge and the curved rear edge have a junction with each other that is located rearward of the ball and socket connection in the streamlined position of the air scoop.

5. An air deflector as in claim 4 wherein the ball and socket connection includes a first ball socket portion having an integral elongated bracket for receiving and securing the lower edge of the air scoop, a second ball socket portion, and a ball on the support member, said first and second ball socket portions being cooperable with each other to receive the ball and adjustably position the air scoop.

6. A vehicle air deflector for use with a vehicle side door including a vertically movable window, a rear view mirror, and a detachable mirror support for mounting the mirror on the exterior of the door adjacent the front extremity of the window, the air deflector comprising: an air scoop; a support member having a support portion that supports the air scoop and a plate-like mounting portion that is positioned between and engaged with the door and the detachable mirror support during mounting so as to be maintained in position on the door; the plate-like mounting portion defining at least one hole for receiving one securement screw of the rear view mirror support and also defining an elongated slot for receiving another securement screw of the rear view mirror support; and an adjustable ball and socket connection that mounts the air scoop on the support portion of the support member for horizontal and vertical adjustment of the directions of air deflection.

7. An air deflector as in claim 6 wherein the plate-like mounting portion defines an opening between the hole and the slot thereof, said opening being oriented to open in a vertical direction for receiving rear view mirror remote controls when the mounting portion is positioned between the door and the rear view mirror support.

8. An air deflector as in claim 7 wherein the plate-like mounting portion includes an upwardly extending projection having a hole for a securement screw, and the opening of the mounting portion being oriented to open in a downward direction below the upwardly extending projection.

9. A vehicle air deflector for use with a vehicle side door including a vertically movable window having a rearwardly inclined front edge, a rear view mirror, and a detachable mirror support for mounting the mirror on the exterior of the door adjacent the inclined front edge of the window, the air deflector comprising: an air scoop having a curved configuration and including a straight lower edge as well as a curved forward and upper edge and a curved rear edge that cooperate to give the scoop a swept-back shape in a streamlined position thereof; a support member including a support portion for supporting the scoop and a plate-like mounting portion that is positioned between and engaged with the door and the detachable mirror support during mounting so as to be maintained in position on the door; said plate-like mounting portion having an opening for receiving rear view mirror remote controls upon being positioned between the door and the rear view mirror support; and an adjustable ball and socket connection that mounts the air scoop on the support portion of the support member in an adjustable manner to permit adjustment of the horizontal and vertical directions of air deflection independently of each other.

* * * * *